(12) United States Patent
Raje et al.

(10) Patent No.: US 6,730,708 B2
(45) Date of Patent: May 4, 2004

(54) FISCHER-TROPSCH PROCESSES AND CATALYSTS USING ALUMINUM BORATE SUPPORTS

(75) Inventors: Ajoy P. Raje, Stillwater, OK (US); Joe D. Allison, Ponca City, OK (US); Kevin L. Coy, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 93 days.

(21) Appl. No.: 09/898,287

(22) Filed: Jul. 3, 2001

(65) Prior Publication Data

US 2002/0037937 A1 Mar. 28, 2002

Related U.S. Application Data

(60) Provisional application No. 60/215,718, filed on Jul. 3, 2000.

(51) Int. Cl.$^7$ .............................. C07C 27/00; B01J 21/02
(52) U.S. Cl. ....................... 518/715; 518/700; 518/721; 502/202; 502/207
(58) Field of Search ................................ 518/700, 715, 518/721; 502/202, 207

(56) References Cited

U.S. PATENT DOCUMENTS

| | | | |
|---|---|---|---|
| 3,883,442 A | 5/1975 | McArthur | 252/432 |
| 4,024,171 A | 5/1977 | McArthur | 260/449.6 |
| 4,034,061 A | 7/1977 | McArthur | 423/213.5 |
| 4,088,671 A | 5/1978 | Kobylinski | 260/449.6 |
| 4,568,698 A | 2/1986 | Desmond et al. | 518/713 |
| 4,654,458 A | 3/1987 | Jezl et al. | 585/500 |
| 4,661,525 A | 4/1987 | Grazioso et al. | 518/714 |
| 4,743,574 A | 5/1988 | Morales et al. | 502/206 |
| 4,778,826 A | 10/1988 | Jezl et al. | 518/703 |
| 4,880,763 A | 11/1989 | Eri et al. | 502/302 |
| 4,906,671 A | 3/1990 | Haag et al. | 518/713 |
| 4,945,116 A | 7/1990 | Abrevaya | 518/715 |
| 5,059,574 A | 10/1991 | Abrevaya | 502/261 |
| 5,084,259 A | 1/1992 | Satek et al. | 423/277 |
| 5,135,958 A * | 8/1992 | Radlowski et al. | 518/728 |
| 5,210,060 A * | 5/1993 | Radlowski et al. | 502/202 |
| 5,837,634 A | 11/1998 | McLaughlin et al. | 501/127 |
| 6,149,799 A | 11/2000 | Raybaud et al. | 208/49 |
| 6,224,846 B1 | 5/2001 | Hurlburt et al. | 423/625 |
| 6,239,184 B1 | 5/2001 | Beer et al. | 518/709 |
| 6,262,132 B1 | 7/2001 | Singleton et al. | 518/715 |
| 6,303,531 B1 | 10/2001 | Lussier et al. | 502/84 |

FOREIGN PATENT DOCUMENTS

| | | | |
|---|---|---|---|
| EP | 0 208 102 | 5/1986 | C07C/29/15 |
| WO | 99/42214 | 8/1999 | B01J/33/00 |
| WO | 00/10698 | 2/2000 | |
| WO | 00/10704 | 2/2000 | B01J/21/08 |
| WO | 00/10705 | 2/2000 | B01J/21/08 |
| WO | 00/16901 | 3/2000 | B01J/23/83 |

OTHER PUBLICATIONS

Zhang, Yu, et al; *Studies on the Chemisorption of CO, H2 and their Interaction on Amorphous*; Chemical Journal of Chinese Universities; vol. 17, No. 1, (1997) ; (pp. 131–133).
Li, Jinlin, et al; *Effect of Boron and Ruthenium on the Catalytic Properties of Co/TiO$_2$ Fischer–Tropsch Catalysts*; Preprints Symposia; Division of Petroleum Chemistry, In c.; vol. 45, No. 2, Mar. 2000; (pp. 253–255).
Bromfield, Tracy C., et al; *The Effect of Sulfide Ions on a Precipitated Iron Fischer–Tropsch Catalysts*; Applied Catalysis A: General 186 (1999) (pp. 297–307).
Chen, Yin–Zu, et al; *Chemisorptive and Catalytic Properties of Cobalt Boride Catalysts Co Hydrogeneration*; Journal of The Chin., 1. Ch. E., vol. 23, No. 2, 1992; (pp. 119–126).
Pavlenko et al, *Influence of the Nature of the Modifying Cation on the Activity and Selectivity of Co/SIO$_2$ Catalysis for Hydrocarbon Synthesis from Co and H2*, Theoretical and Experimental Chemistry, vol. 28, 162–166, (1992).
Zhang, Ju, et al; *Study on the Thermal Stability of Amorphous Ni(Co)–B Alloys and their Catalysts*; Journal of Molecular Catalysis (China), vol. 9, No. 2, Apr. 1995 (pp. 152–156).
Yao, Kai–wen, et al; *Studies on the Ultrafine Amorphous Co–B Alloy Particle Catalysis*; Chinese Journal of Catalysis; vol. 16, No. 4, Jul. 1995; (pp. 253–254).
Li, Jinlin, et al; *The Effect of Boron on the Catalysts Reducibility and Activity of Co/TiO$_2$ Fischer–Tropsch Catalysts*; Applied Catalysis A: General 181 (1999) (pp. 201–208).
Wang, Jueh et al, *Preparation and Activity/selectivity Properties of Borided Cobalt Fischer–Tropsch Catalyst*, Proceedings 9$^{th}$ International Congress on Catalysis, vol. 2 C1 Chemistry, (1988).
PCT International Search Report for Appln. No. PCT/US01/21169 dated Jun. 20, 2002 (5 p.).
Bessel, *Supports Effects in Cobalt–Based Fisher tropsch Catalysis*, Applied Catalysis A: General, 96 (1993) pp. 253–268.
Flego et al., *Characterization of ν–Alumina and Borated Alumina Catalysis*, Applied Catalysis A: General 185 (1999) pp. 137–152.

* cited by examiner

Primary Examiner—J. Parsa
(74) Attorney, Agent, or Firm—Conley Rose, P.C.

(57) ABSTRACT

A process is disclosed for the hydrogenation of carbon monoxide. The process involves contacting a feed stream comprising hydrogen and carbon monoxide with a catalyst system in a reaction zone maintained at conversion-promoting conditions effective to produce an effluent stream, preferably comprising hydrocarbons. In accordance with this invention the catalyst system used in the process includes at least one catalytic material for Fischer-Tropsch reactions (e.g., iron, cobalt, nickel and/or ruthenium), preferably comprising cobalt, and a support comprising aluminum borate. The catalyst system can be prepared by impregnating alumina with a boron-containing composition to form an aluminum borate support and applying a Fischer-Tropsch catalytically active material to the aluminum borate to form a supported catalyst system.

16 Claims, No Drawings

FISCHER-TROPSCH PROCESSES AND CATALYSTS USING ALUMINUM BORATE SUPPORTS

CROSS-REFERENCE TO RELATED APPLICATIONS

The present application claims benefit of priority from U.S. application Ser. No. 60/215,718, filed Jul. 3, 2000 and entitled "Fischer-Tropsch Processes And Catalysts Using Aluminum Borate Supports," which is incorporated herein by reference.

STATEMENT REGARDING FEDERALLY SPONSORED RESEARCH OR DEVELOPMENT

Not applicable.

FIELD OF THE INVENTION

The present invention relates to a process for the hydrogenation of carbon monoxide to produce hydrocarbons and/or oxygenates. More particularly, the present invention relates to the use of an aluminum borate supported Fischer-Tropsch catalyst. Still more particularly, the present invention relates to the use of a cobalt or a promoted cobalt Fischer-Tropsch catalyst on an aluminum borate support.

BACKGROUND OF THE INVENTION

Large quantities of methane, the main component of natural gas, are available in many areas of the world. However, most natural gas is situated in areas that are geographically remote from population and industrial centers. The costs of compression, transportation, and storage make the use of this remote gas economically unattractive. To improve the economics of natural gas use, much research has focused on the use of methane as a starting material for the production of higher hydrocarbons and hydrocarbon liquids.

As a result, various technologies for the conversion of methane to hydrocarbons have evolved. The conversion is typically carried out in two steps. In the first step, methane is reformed with water or partially oxidized with oxygen to produce carbon monoxide and hydrogen (i.e., synthesis gas or syngas). In a second step, the syngas is converted to hydrocarbons.

This second step, the preparation of hydrocarbons from syngas, is well known in the art and is usually referred to as Fischer-Tropsch synthesis, the Fischer-Tropsch process, or Fischer-Tropsch reaction(s). The Fischer-Tropsch reaction involves the catalytic hydrogenation of carbon monoxide to produce a variety of products ranging from methane to higher aliphatic hydrocarbons and/or alcohols. The methanation reaction was first described in the early 1900's, and the later work by Fischer and Tropsch dealing with higher hydrocarbon synthesis was described in the 1920's.

The Fischer-Tropsch synthesis reactions are highly exothermic and reaction vessels must be designed for adequate heat exchange capacity. Because the feed streams to Fischer-Tropsch reaction vessels are gases, while the product streams include liquids, the reaction vessels must have the ability to continuously produce and remove the desired range of liquid hydrocarbon products. The first major commercial use of the Fischer-Tropsch process was in Germany during the 1930's. More than 10,000 B/D (barrels per day) of products were manufactured with a cobalt based catalyst in a fixed-bed reactor. This work was described by Fischer and Pichler in Ger. Patent 731,295 issued Aug. 2, 1936.

Motivated by the hope of producing high-grade gasoline from natural gas, research on the possible use of the fluidized bed for Fischer-Tropsch synthesis was conducted in the United States in the mid-1940s. Based on laboratory results, Hydrocarbon Research, Inc. constructed a dense-phase fluidized bed reactor, the Hydrocol unit, at Carthage, Tex., using powdered iron as the catalyst. Due to disappointing levels of conversion, scale-up problems, and rising natural gas prices, operations at this plant were suspended in 1957. Research continued, however, on developing Fischer-Tropsch reactors, such as slurry-bubble columns, as disclosed in U.S. Pat. No. 5,348,982. Despite significant advances, however, certain areas of Fischer-Tropsch technology still have room for improvement.

Catalysts for use in the Fischer-Tropsch synthesis usually contain a catalytically active metal of Group VIII. In particular, iron, cobalt, nickel, and ruthenium have been used as the catalytically active materials. Nickel is useful for a process in which methane is a desired product. Iron has the advantage of being readily available. Ruthenium has the advantage of high activity and thus is typically used a promoter for another of the catalytic materials, due to the limited availability of ruthenium. Cobalt has the advantages of being more active than iron and more available than ruthenium. Further, cobalt is less selective to methane than nickel. Thus, cobalt has been investigated as a catalyst for the production of hydrocarbons with weights corresponding to the range of the gasoline, diesel, and higher weight fractions of crude oil.

Additionally, the catalysts often contain one or more promoters and a support or carrier material. Research is continuing on the development of more efficient Fischer-Tropsch catalyst systems and catalyst systems that increase the activity of the catalyst. In particular, catalyst supports that have been investigated include ceramic supports. Ceramic supports include various structural forms of alumina, such as alpha and gamma alumina, in addition to silica, titania, zirconia, zeolites, spinels, sol-gels, co-gels, and the like. It is known that the catalyst activity can vary with the composition and structure of the support.

Despite the vast amount of research effort in this field, Fischer-Tropsch catalysts supported on current ceramic supports are not always sufficiently active. Hence, there is still a great need to identify new catalyst supports, particularly catalyst supports that result in improved catalyst activity and thus enhance the process economics.

SUMMARY OF THE INVENTION

This invention relates to a process and catalyst for producing hydrocarbons, and includes a catalytically active material containing cobalt and a catalyst support containing aluminum borate. The Fischer-Tropsch synthesis process includes contacting a feed stream comprising hydrogen and carbon monoxide with this supported catalytic material in a reaction zone maintained at conversion-promoting conditions effective to produce an effluent stream including hydrocarbons.

The present catalyst preferably comprises a support including from about 20 to about 60 wt % aluminum, from about 0.5 to about 10 wt % boron, and from about 40 to about 70 wt % oxygen. The present catalyst preferably further contains a catalytically active material including from about 10 to about 25 wt % cobalt, and preferably also includes a promoter in a concentration sufficient to provide a weight ratio of elemental promoter to elemental cobalt between about 0.0001 and about 0.5. The promoter is chosen from Groups 1–11 and 13 of the Periodic Table New Notation). Less preferred promoters are selected from Groups 12 and 14. The support preferably includes 2 to 5 wt % boron and the catalyst preferably includes 10 to 25 wt % cobalt.

In a particular aspect of the present invention, the catalyst is prepared by a method including impregnating alumina with a boron-containing composition to form an aluminum borate support; and impregnating the aluminum borate with a composition comprising cobalt and optionally rhenium to form a supported catalyst. The resulting catalyst system is adapted to hydrogenate carbon monoxide.

In another aspect of the present invention, the aluminum borate support is used in a catalyst system for the production of hydrocarbons in a process that includes contacting a feed stream including hydrogen and carbon monoxide with the catalyst system in a reaction zone maintained at conversion-promoting conditions effective to produce an effluent stream comprising hydrocarbons.

The process and catalyst of the present invention have the advantage of being adapted to provide superior catalytic activity, in particular as compared to a catalyst having the same catalytically active material composition on a conventional alumina support.

DETAILED DESCRIPTION OF THE PREFERRED EMBODIMENTS

Catalyst Support

According to the present invention, effective Fischer-Tropsch catalysts can be supported on an aluminum borate support. "Aluminum borate" as used herein is defined as a composition comprising aluminum, oxygen, and boron, which has been prepared such that boron or boron oxide is bonded to alumina. The boron content of the aluminum borate can vary over a wide range, from about 0.5% to about 15% by weight of the total support. Preferred aluminum borates contain from 1% to about 8% by weight boron, and more preferably from about 2% to about 5% by weight boron. The remainder of the aluminum borate component essentially comprises aluminum and oxygen.

In determining the amount of boron to include in the support, it may be desirable to take into account the acidity of the resulting support. In particular, it is believed to be desirable to achieve a support that is more acidic than neutral (pH=7) alumina and less acidic than a zeolite cracking catalyst. The acidity of supports can be measured by any one of the standard techniques, such as ammonia temperature programmed desorption (TPD), infra-red spectroscopy of pyridine adsorption or titration with Hammett indicators. It is believed that the acidity of the support affects the activity and selectivity of the supported catalyst system. Therefore, by controlling the proportion of boron in the support, the activity and selectivity can be at least somewhat optimized.

A preferred aluminum borate support has the nominal composition $Al_xB_yO_z$, where x is 1, y is greater than 0 and up to about 1, and z is between about 1.5 and about 3, inclusive. The aluminum borate support can take various forms, including: the oxide aluminum borate, a physical mixture of alumina and borate, and a skeleton of alumina having a surface layer of aluminum borate. The catalyst support may also contain a minor amount (compared to aluminum) of silicon, titanium, phosphorus, zirconium and/or magnesium. Borated alumina is also a preferred support, prepared by a process including impregnating an alumina support with a boron-containing composition, such as boric acid.

The support material comprising aluminum borate may be prepared by a variety of methods. For example, as in the formation of borated alumina, aluminum borate may be prepared by impregnation of alumina with aqueous boric acid followed by calcination in air. Calcination temperatures are preferably greater than 400° C., more preferably greater than 450° C. and more preferably greater than 500° C. Alternative methods involve vapor decomposition with ethyl borate and co-precipitation from an aluminum nitrate and boric acid solution using ammonium hydroxide. The supports of the present invention can be used in any suitable form, including powders, particles, pellets, monoliths, honeycombs, packed beds, foams, and aerogels.

Catalytically active materials can be applied to the aluminum borate support of the present invention by any suitable method. By way of illustration and not limitation, such methods include impregnating the catalytically active compounds or precursors onto the support, extruding one or more catalytically active compounds or precursors together with support material, and/or precipitating the catalytically active compounds or precursors onto the support. A exemplary catalyst system has a nominal composition $M_sAl_xB_yO_z$, where M is a catalytic material, where x is 1, and where s is between 0.1 and about 0.4, y is greater than 0 and up to about 1, and z is between about 1.5 and about 3, inclusive. An alternative preferred catalyst system has the nominal composition $Co_tM_uAl_xB_yO_z$, where M is a promoter selected from Groups 1–11 and 13 of the Periodic Table (New Notation), x is 1, t is between about 0.1 and about 0.4, u is between about 0.0005 and about 0.0054, y is greater than 0 and up to about 1, and z is between about 1 and about 4.

The most preferred method of preparation may vary, as will be recognized by those skilled in the art, depending for example on the desired catalyst particle size. Those skilled in the art will be able to select the most suitable method for a given set of requirements.

One method of preparing a supported catalyst in accordance with the present invention (e.g., a supported cobalt, or cobalt/promoter catalyst) is by incipient wetness impregnation of the support with an aqueous solution of a soluble metal salt such as nitrate, acetate, acetylacetonate or the like. Another method of preparing a supported catalyst is by a melt impregnation technique, which involves preparing the supported catalyst from a molten metal salt. One preferred method is to impregnate the support with a molten metal nitrate (e.g., $Co(NO_3)_2 \cdot 6H_2O$). Alternatively, the support can be impregnated with a solution of a zero valent metal precursor.

The impregnated support is dried, and may be calcined by oxidization with air or oxygen and reduced in the presence of hydrogen. The reduction and calcination steps may not be necessary if the catalyst is prepared with zero valent cobalt. If calcination and/or reduction steps are performed, it is preferred that they be performed at temperatures below that which would cause sintering of the cobalt or other catalytic material. In particular, it is preferred that the calcination following addition of the catalytic material be performed at temperatures that do not exceed 350° C. and preferably do not exceed 400° C.

Catalyst

Catalysts that are contemplated for use in the present method include any of the Fischer-Tropsch catalysts known in the art, such as cobalt, ruthenium, cobalt/ruthenium, cobalt/rhenium, iron, and nickel. In particular, the catalyst preferably includes cobalt. The amount of cobalt present in the catalyst may vary widely. Typically, the catalyst comprises cobalt in an amount totaling from about 10 to 25% by weight (as the metal) of the total weight of catalytic material and support, preferably from about 12 to 25% by weight, and more preferably from about 15 to about 23% by weight.

The catalyst may also include a promoter selected from Groups 1–11 and 13 of the Periodic Table (New Notation). Less preferred promoters are selected from Groups 12 and 14. Particularly preferred promoters include but are not limited to: nickel, chromium, iron, molybdenum, potassium, manganese, vanadium, rhenium and ruthenium. The amount of promoter is added to the cobalt catalyst in a concentration sufficient to provide a weight ratio of elemental promoter to elemental cobalt between about 0.0001 and about 0.5, and preferably between about 0.001 and about 0.1 (dry basis).

As mentioned above, it is normally advantageous to activate the catalyst prior to use by reducing it in the presence of hydrogen at an elevated temperature. Typically, the catalyst is treated with hydrogen at a temperature in the range of from about 75° C. to about 500° C., for about 0.5 to about 24 hours at a pressure of about 1 to about 50 atm. Pure hydrogen may be used in the reduction treatment, as may a mixture of hydrogen and an inert gas such as nitrogen, or a mixture of hydrogen and other gases as are known in the art, such as carbon monoxide and carbon dioxide. Reduction with pure hydrogen and reduction with a mixture of hydrogen and carbon monoxide are preferred. The amount of hydrogen may range from about 1% to about 100% by volume.

Catalysis

The feed gases charged to the synthesis process comprise hydrogen, or a hydrogen source, and carbon monoxide. $H_2/CO$ mixtures suitable as a feedstock for conversion to hydrocarbons according to the synthesis process can be obtained from light hydrocarbons such as methane by means of steam reforming, partial oxidation, or other processes known in the art. Preferably, the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the feed be greater than 0.5:1 (e.g., from about 0.67:1 to 2.5:1). The feed gas stream may contain hydrogen and carbon monoxide in a molar ratio of about 2:1. The feed gas stream may also contain carbon dioxide. The feed gas stream may contain a low concentration of compounds or elements that have a deleterious effect on the catalyst, such as poisons. In these cases, the feed gas may need to be pre-treated to remove the low concentrations of sulfur or nitrogen compounds such as hydrogen sulfide, ammonia and carbonyl sulfides.

The feed gas is contacted with the catalyst in a reaction zone. Mechanical arrangements of conventional design may be employed as the reaction zone including, for example, fixed bed, fluidized bed, slurry phase, slurry bubble column, reactive distillation column, or ebulliating bed reactors, among others. The size and physical form of the catalyst mass may vary, depending on the reactor in which it is to be used.

The Fischer-Tropsch process is typically run in a continuous mode. In this mode, the gas hourly space velocity through the reaction zone may range from about 100 volumes/hour/volume catalyst (v/hr/v) to about 15,000 v/hr/v, and is preferably between about 1000 v/hr/v and about 10,000 v/hr/v. The reaction zone temperature is typically in the range of from about 160° C. to about 325° C. Preferably, the reaction zone is operated at conversion promoting conditions at temperatures from about 190° C. to about 260° C. The reaction zone pressure is typically between about 80 psig (653 kPa) and about 1000 psig (6994 kPa), more preferably from 80 psig (653 kPa) to about 600 psig (4237 kPa), and still more preferably from about 140 psig (1066 kPa) to about 500 psig (3573 kPa).

The products resulting from Fischer-Tropsch synthesis will have a range of molecular weights. Typically, the carbon number range of the product hydrocarbons will start at methane and continue to the limits observable by modem analysis, about 50 to 100 carbons per molecule. The catalyst of the present process is particularly useful for making hydrocarbons having five or more carbon atoms, especially when the above-referenced preferred space velocity, temperature and pressure ranges are employed.

EXAMPLE

A catalyst having the composition 20.9% Co/1.05% Re on an aluminum borate support containing 4.3% B was prepared and tested according to the following procedures.

Aluminum Borate Preparation

The preparation of borated $Al_2O_3$ was achieved via the wet impregnation technique. 10.23 g of $H_3BO_3$ and 40.08 g of $Al_2O_3$ were charged into a 500 mL rotovap flask. To this, 50.03 g of $H_2O$ was added to form a boric acid solution over the insoluble $Al_2O_3$. This mixture was rotated at 75° C. for 30 min, then the water was removed under vacuum, while maintaining the flask at 75° C. and the same rotation rate. After drying the resulting support, it was placed in a tube furnace and calcined in flowing air (0.4 NLPM air) according to the following temperature ramps: ambient to 200° C. at a ramp rate of 5° C./min, dwelling at 200° C. for 1 hour; 200° C. to 500° C. at a ramp rate of 5° C./min, dwelling at 500° C. for 4 hours.

Supported Catalyst Preparation

The preparation of the Co/Re supported catalyst was done via the "melt" technique. 49.41 g of $Co(NO_3)_2 \times 6H_2O$ and 0.7230 g of $[NH_4]ReO_4$ were melted in a 500 mL rotovap flask while rotating at 75° C. To this melted mixture, 37.26 g of the above borated $Al_2O_3$ were added. The mixture was thoroughly rotated to mix and coat the borated $Al_2O_3$ with the Co/Re melt while cooling. The cooled mixture (now a pink powder), was loaded into a tube furnace and calcined in flowing air (0.4 NLPM air) according to the following temperature ramps: ambient to 200° C. at a ramp rate of 5° C./min, dwelling at 200° C. for 1 hour; 200° C. to 400° C. at a ramp rate of 5° C./min, dwelling at 400° C. for 4 hours.

This calcined catalyst was reduced in flowing hydrogen (0.4 NLPM $H_2$) according to the following temperature ramps: ambient to 200° C. at a ramp rate of 5° C./min, dwelling at 200° C. for 30 minutes; 200° C. to 450° C. at a ramp rate of 5° C./min, dwelling at 450° C. for 4 hours.

Catalyst Testing

The following batch testing procedure was used to test the Fischer-Tropsch catalyst prepared in the above manner. In a $N_2$-filled glove box, reduced Fischer-Tropsch catalyst was added to a batch reactor (while cool) such that the catalyst resided in the bottom 2" of the 0.5" diameter by 6" long reactor heated zone. The reactor was fitted with a reactor head consisting of a ball valve, pressure transducer and relief valve. The assembly was sealed, brought out of the glove box and connected to a high pressure synthesis gas (2:1 $H_2$:CO) line. The reactor was purged with syngas at a low rate to flush the reactor of the resident $N_2$. Pressure was increased inside the reactor to 400 psia with syngas. The reactor was then inserted into a 220° C. sand bath to facilitate the Fischer-Tropsch reaction. Pressure was followed and plotted versus time. The reactor was removed from the sand bath after about 70 to 85 minutes and allowed to cool to room temperature. A sample of the gases in the reactor head space was analyzed using a gas chromatograph to obtain carbon monoxide, hydrogen, carbon dioxide, and $C_1$ to $C_4$ hydrocarbons. The reactor was then opened and the liquid hydrocarbon product was extracted using a solvent and analyzed for $C_5$ to $C_{53}$ hydrocarbons using a gas chromatograph.

The results were analyzed in two different ways. First, the CO conversion as a function of reaction time can be estimated from the decrease in reactor pressure. As a first approximation, the Fischer-Tropsch reaction can be written as $$CO+2H_2 \rightarrow 0.1(-CH_2-)_{10}+H_2O. \quad (1)$$

There is a net consumption of moles during reaction which leads to a decrease in the reactor pressure. Assuming all the reaction products are in the vapor phase at reaction conditions, the CO conversion (X) can be related to the reactor pressure as $$X=(3/1.9)(1-(P/P_0)), \quad (2)$$

where P is the pressure in the reactor at time t and $P_0$ is the initial pressure at time t=0. The CO conversion calculated in this way is believed to underestimate the actual conversion by a small amount, due to the simultaneous occurrence of the methanation reaction to a limited extent. Nevertheless, this procedure is useful for comparing catalysts at both low and high estimated CO conversions.

In the second analysis method, the actual CO conversion and selectively can be determined from the known pressure and composition (from a gas chromatograph) of the reactor gases at the start and end of reaction. Further, the Anderson-Shulz-Flory (ASF) chain propagation probability, α, can be determined from hydrocarbon compositions.

Comparison with Alumina Supported Catalyst

A commercially prepared catalyst was obtained from a major catalyst vendor. The catalyst included 20% Co and 1% rhenium on an alumina support. This catalyst was tested according to the batch testing procedure described above. The results of the tests of each catalyst are described below.

Referring to Table 1, the estimated CO conversion (from equation 2) is shown as a function of reaction time for both catalysts. Table 1 shows that the aluminum borate supported catalyst exhibits much higher CO conversions that the alumina supported catalyst at low/moderate values of the reaction time (less than 70 minutes.) Thus, the aluminum borate supported catalyst exhibits superior activity as compared to the alumina catalyst.

In particular, Table 1 contains the numerical values of the estimated CO conversion at various reaction times. As shown in Table 1, the reaction time for 60% percent conversion for an aluminum borate supported catalyst is 30 minutes whereas it is twice as long (60 minutes) for the alumina supported catalyst. Typically, a commercial Fischer-Tropsch reactor will be a continuous flow reactor and be operated at a moderate single pass CO conversion, such as 50% to 70% with recycle to achieve higher conversions. Thus, based on the results given in Table 1, it is believed that the size of a commercial reactor, or the catalyst amount using an aluminum borate supported catalyst, would be about half that for an alumina supported catalyst.

TABLE 1

Estimated CO Conversions

| Reaction Time (minutes) | Estimated CO Conversion | |
|---|---|---|
| | Alumina Supported (%) | Aluminum Borate Supported (%) |
| 10 | 6.9 | 50.5 |
| 20 | 17.1 | 56.5 |
| 30 | 27.3 | 60.4 |
| 40 | 37.9 | 63.4 |
| 50 | 48.9 | 65.9 |
| 60 | 59.7 | 67.9 |

TABLE 1-continued

Estimated CO Conversions

| Reaction Time (minutes) | Estimated CO Conversion | |
|---|---|---|
| | Alumina Supported (%) | Aluminum Borate Supported (%) |
| 70 | 66.4 | 69.3 |
| 77 | 70.0 | 70.1 |

Table 2 shows the CO conversions and selectivity determined by a gas chromatographic analysis of the reactor contents before and after reaction. The CO conversion of the aluminum borate supported catalyst at the end of the run, 85%, is greater than the CO conversion of the alumina supported catalyst, 77%. These results further support the conclusion that the aluminum borate supported catalyst shows superior activity to the alumina supported catalyst. the ASF α values for both catalysts are similar (within experimental error) and indicate a similar selectivity to light, middle, and heavy hydrocarbon distillates.

TABLE 2

CO conversion and selectivity from Gas Chromatograph.

| Property | Alumina Supported Catalyst | Aluminum Borated Supported Catalyst |
|---|---|---|
| CO conversion | 76.9% | 85.3% |
| Percentage of moles of CO converted to methane | 23.9% | 51.1% |
| Percentage of moles of CO converted to $CO_2$ | 4.6% | 13.6% |
| Percentage of moles of CO converted to $C_{2+}$ Hydrocarbons | 71.5% | 35.3% |
| α | 0.865 | 0.834 |

It will be understood that in the claims that follow, references to a "similar catalyst system," are intended to refer to catalyst systems in which the catalytic materials that are applied to the support have the same nominal chemical composition.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A process for the production of hydrocarbons, comprising:
    contacting a feed stream comprising hydrogen and carbon monoxide with a cobalt-containing catalyst system in a reaction zone maintained at conversion-promoting conditions effective to produce an effluent stream comprising hydrocarbons, said catalyst system comprising a Fischer-Tropsch catalytically active material on a support wherein the support comprises a skeleton of alumina with aluminum borate on the surface of the alumina skeleton wherein the catalyst system comprises at least about 10 wt % cobalt.

2. The process according to claim 1 wherein the support comprises between about 0.5 and about 5 wt % boron.

3. The process according to claim 1 wherein said support comprises aluminum in an amount between about 20 and about 60 wt % of the support, and boron in an amount sufficient to cause the surface of the support to be more acidic than the surface of a neutral (pH=7) alumina but less acidic than a zeolite cracking catalyst.

4. The process according to claim 1 wherein the support comprises between about 2 and about 5 wt % boron.

5. The process according to claim 1 wherein the catalyst system comprises between about 12 and about 25 wt % cobalt.

6. The process according to claim 1, further comprising a promoter selected from Groups 1–11 and 13 of the Periodic Table (New Notation) wherein the promoter is present in a concentration sufficient to provide a weight ratio of elemental promoter to elemental cobalt between about 0.0001 and about 0.5.

7. A process for the production of hydrocarbons, comprising:

contacting a feed stream comprising hydrogen and carbon monoxide with a catalyst system in a reaction zone maintained at conversion-promoting conditions effective to produce an effluent stream comprising hydrocarbons, said catalyst system comprising a catalyst comprising cobalt in an amount between about 10 and about 25 wt % said catalyst being supported on a support comprising a skeleton of alumina and aluminum borate on the surface of the alumina skeleton, the support having been prepared from a precursor comprising boron in an amount between about 2 wt % and about 5 wt %.

8. The process according to claim 7, wherein the catalyst further comprises a promoter selected from Groups 1–11 and 13 of the Periodic Table (New Notation) present in a concentration sufficient to provide a weight ratio of elemental promoter to elemental cobalt between about 0.0001 and about 0.5.

9. A process for the production of hydrocarbons, comprising:

contacting a feed stream comprising hydrogen and carbon monoxide with a catalyst system in a reaction zone maintained at conversion-promoting conditions effective to produce an effluent stream comprising hydrocarbons, said catalyst system comprising a catalytically effective amount of a Fischer-Tropsch catalytically active material selected from Groups 8–10 of the Periodic Table (New Notation), wherein the support comprises a skeleton of alumina with aluminum borate on the surface of the alumina skeleton and wherein the catalyst system comprises at least about 10 wt % cobalt.

10. The process according to claim 9 wherein the support comprises between about 0.5 and about 5 wt % boron.

11. The process according to claim 9 wherein said support comprises aluminum in an amount between about 20 and about 60 wt % of the support, and boron in an amount sufficient to cause the surface of the support to be more acidic than the surface of a neutral (pH=7) alumina but less acidic than a zeolite cracking catalyst.

12. The process according to claim 9 wherein the support comprises between about 2 and about 5 wt % boron.

13. The process according to claim 9 wherein the catalyst system comprises at least about 10 wt % cobalt.

14. The process according to claim 9 wherein the catalyst system comprises between about 12 and about 25 wt % cobalt.

15. The process according to claim 9, further comprising a promoter selected from Groups 1–11 and 13 of the Periodic Table (New Notation) wherein the promoter is present in a concentration sufficient to provide a weight ratio of elemental promoter to elemental cobalt between about 0.0001 and about 0.5.

16. The process according to claim 7 wherein said support comprises aluminum in an amount between about 20 and about 60 wt % of the support, and boron in an amount sufficient to cause the surface of the support to be more acidic than the surface of a neutral (pH=7) alumina but less acidic than a zeolite cracking catalyst.

* * * * *